N. W. LAMBERT.
ADJUSTABLE BEARING BOLT.
APPLICATION FILED MAR. 30, 1917.
1,287,350. Patented Dec. 10, 1918.
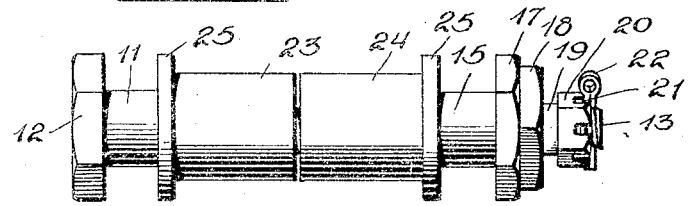
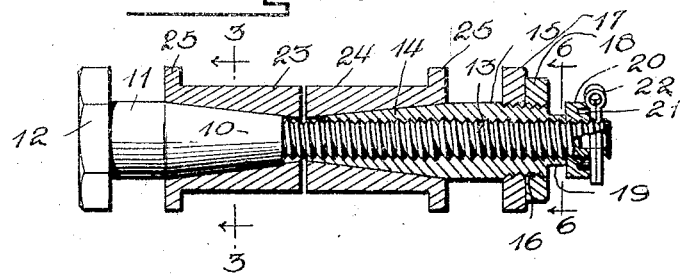
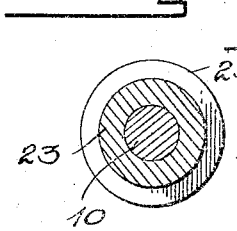 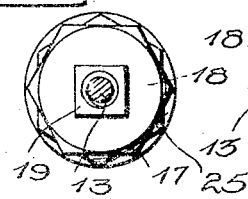 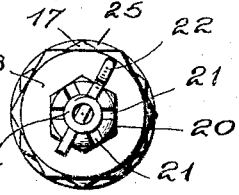
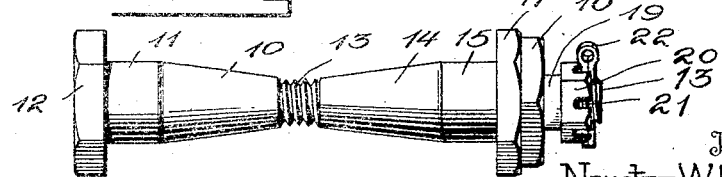
Inventor
Newton W. Lambert

UNITED STATES PATENT OFFICE.

NEWTON W. LAMBERT, OF NORTH PLAINFIELD, NEW JERSEY.

ADJUSTABLE BEARING-BOLT.

1,287,350.  Specification of Letters Patent.  Patented Dec. 10, 1918.

Application filed March 30, 1917. Serial No. 158,693.

*To all whom it may concern:*

Be it known that I, NEWTON W. LAMBERT, a citizen of the United States, and a resident of North Plainfield, in the county of Somerset and State of New Jersey, have invented a certain new and useful Improvement in Adjustable Bearing-Bolts, of which the following is a specification.

The present invention relates to bolts or spindles.

An object of the present invention is to provide a bolt adapted for use as a means for connecting the parts together, and also to provide a bearing admitting of the relative movement of the parts.

Another object of the present invention is to provide a bearing bolt with cones adjustable toward and from each other to take up wear, and with heads which may be adjusted toward and from each other independently of the adjustment of the cones to adapt the bolts to various applications.

The above, and various other objects and advantages of this invention will be in part described, and in part understood, from the following detailed description of the present preferred embodiment, the same being illustrated in the accompanying drawing wherein:

Figure 1 is a side elevation of a complete bolt constructed according to the present invention.

Fig. 2 is a longitudinal central section taken through the same.

Fig. 3 is a transverse section taken through the bolt on the line 3—3 of Fig. 2, showing one of the cones and the bushings mounted thereon.

Fig. 4 is an end view of the bolt.

Fig. 5 is a side elevation of the bolt, the bushings being removed therefrom.

Fig. 6 is a transverse section taken on the line 6—6 of Fig. 2 showing the angular headed end of the adjustable cone.

Referring to this drawing, wherein like parts are designated by similar characters of reference throughout the several views, 10 designates a bearing cone provided with a relatively long taper, and which is provided upon its larger or outer end with a cylindrical bearing portion 11 merging into the cone 10, and which terminates at its outer extremity in an enlarged preferably angularly faced head 12.

The smaller end of the cone 10 terminates in an axially extending shank 13 which is preferably externally screw-threaded throughout its length, and over which is threaded a second cone 14 of substantially the same configuration as the cone 10 and merging at its larger end into a cylindrical bearing portion 15 of preferably the same diameter as the cylindrical portion 11. The cone 14 is threaded upon the shank 13 with the smaller end of the cone 14 extending toward the smaller end of the cone 10, and the cylindrical portion 15 is provided at its outer end with an externally threaded portion 16 upon which is threaded an adjustable head 17. The head 17 is preferably in the form of a nut adapted for adjustment over the threaded portion 16 toward and from the fixed head 12 to adapt the bolt to various applications. The head 17 is locked in adjusted position upon the threaded portion 16 by means of a lock-nut 18 which is also threaded upon the portion 16 and adapted to be jammed up against the head 17.

The cone 14 is provided upon its outer end with a reduced angularly faced head 19 which projects beyond the threaded portion 16, and which is adapted to receive a suitable tool thereon for turning the cone 14 for adjustment toward and from the cone 10. A cone-locking nut 20 is threaded upon the outer end of the shank 13 and is adapted to be jammed against the head 19 to hold the cone 14 in adjusted position. The outer face of the nut 20 is provided with a plurality of diametrically extending slots or recesses 21 adapted to register, one slot at a time, with a transverse opening formed through the outer end of the shank 13, the opening and the slots being adapted to receive a cotter pin 22 or the like therethrough for holding the locking nut 20 from turning.

The cones 10 and 14 are preferably provided with bushings 23 and 24 provided with conical axial openings extending therethrough and adapted to receive the cones 10 and 14 therein. The bushings 23 and 24 have upon their outer ends annular outstanding flanges 25 adapted to confine a suitable number of parts therebetween and to which the bolt of this invention may be applied.

It is of course apparent that the bolt of this invention may be applied to various parts and devices, and that the body of the bolt may be used independently of the bushings 23 and 24 if so desired. The bushings 23 and 24 may be inserted from opposite ends in an eye or sleeve of a member, and the cone 10, with its shank 13 may be inserted through the bushing 23, and the cone 14 then turned up on the shank 13 to engage in the opposite bushing 24. It is apparent that the cone 14 may be advanced into the bushing 24 sufficiently to draw the cone 10 into snug engagement within the bushing 23. The cones may thus be adjusted from time to time to take up wear between the cones and the bushings, or between the cones and any other suitable part or member to which the bolt may be applied. The locking nut 20 is adapted to be jammed against the outer end of the cone 14 to hold the same securely upon the shank 13 when adjusted. An opposite member or part may be engaged upon the cylindrical portions 11 and 15 of the bolt and held thereon between the fixed head 12 and the adjustable head 17. This adjustable head may be advanced toward and from the head 12, and the lock nut 18 may then be jammed against the head 17 to hold it securely in adjusted position.

The cones and bushings are therefore adapted to be adjusted toward and from each other, and the heads 12 and 17 are adapted to be independently adjusted, to vary the distance therebetween. The cotter pin 22 securely holds the lock nut 20 upon the shank 13, and prevents the accidental displacement of the parts which are carried by the shank and the cone 14.

It is of course understood that various changes and modifications may be made in the details of construction of the above specifically described bearing bolt without departing from the spirit of this invention, and being restricted only by the scope of the following claims.

I claim:—

1. An adjustable bearing bolt comprising a bearing cone terminating at its reduced end in an elongated shank, a second bearing cone adjustably mounted upon said shank and adapted for adjustment toward and from the fixed cone, bushings on the cones having annular flanges on their outer ends for holding together the parts through which the bolt is adapted to pass, said cones having their tapering ends extending in directions to coöperate for taking up wear and for binding the bushings against the parts, and means for locking the second cone upon the shank when adjusted.

2. An adjustable bearing bolt comprising a bearing cone terminating at its reduced end in an elongated externally threaded shank, a second bearing cone provided with a central threaded bore therethrough mounted on the shank and adapted for threaded adjustment toward and from the first cone, bushings mounted on the cones and provided with outer end flanges adapted to engage against the work and through which the bolt is adapted to pass, and a locking nut threaded upon the extremity of said shank and adapted for engagement against said second cone to bind the latter in adjusted position.

3. An adjustable bearing bolt having a pair of bearing cones adapted for adjustment toward and from each other, and further having a pair of heads at opposite ends adapted for independent adjustment toward and from each other.

4. An adjustable bearing bolt having a pair of cones adapted for adjustment toward and from each other, and a head on each end, said heads being adapted for adjustment toward and from each other independently of the adjustment of said cones.

5. An adjustable bearing bolt comprising a bearing cone terminating at its smaller end in a threaded shank, a second bearing cone threaded on the shank, bushings having axial conical bores receiving said cones and adapted to turn thereon and provided with annular outer end flanges, said second cone being adapted for adjustment over the shank toward and from the first cone to take up wear between the cones and the bushings and maintain said flanges against parts through which the bolt is adapted to pass for securing the bolts thereto, and means for locking the second cone when adjusted.

6. A bearing bolt comprising a bearing cone having at its larger end a cylindrical bearing terminating in an enlarged head, and having at its smaller end an axially extending shank, a second bearing cone adjustable on the shank toward and from the first cone, means for locking the second cone on the shank when adjusted, a second head adjustably mounted on the second cone and adapted for adjustment toward and from said first head independently of the adjustment of the second cone, and means for securing the second head when adjusted.

7. In a bearing bolt, the combination of a cone provided upon its smaller end with an axially extending externally screw-threaded shank, said cone being provided upon its larger end with a head, a second cone threaded upon said shank and adapted for adjustment toward and from said first cone, said second cone being provided with an externally screw-threaded portion upon its larger outer end, a jam nut carried upon the outer end of said shank for engagement against the second cone to bind the latter in adjusted position, and a second jam nut mounted on said threaded portion of the second cone for engagement against said adjustable head to bind the latter in adjusted position.

8. In a bearing bolt, the combination of a cone provided upon its larger end with a head and upon its smaller end with an axially extending shank, a second cone threaded upon said shank and adapted for adjustment toward and from the first cone, a jam nut mounted upon said shank for engagement against the second cone to bind the latter in adjusted position, a second head threaded upon the outer end of said second cone for adjustment toward and from said first head, and a second jam nut mounted on said second cone for binding engagement against said second head to lock the same in adjusted position.

9. In a bearing bolt, the combination with a cone bearing provided with a head upon its larger end and an axially extending shank upon its smaller end, a second cone threaded upon said shank and provided with an externally threaded portion at its larger end, a second head threaded upon the larger end of said second cone and adapted for adjustment toward and from the first head, a jam nut threaded upon said second cone for binding engagement against said second head to retain the latter in adjusted position, a jam nut mounted upon the outer end of said shank for binding engagement against said second cone to hold the latter in adjusted position, said last-named jam nut being provided upon its outer face with diametrically extending slots, and a cotter pin adapted for engagement through said slots one at a time, and for transverse engagement through the shank to lock the parts of the bolt together.

NEWTON W. LAMBERT.